US010762366B2

(12) United States Patent
Che et al.

(10) Patent No.: US 10,762,366 B2
(45) Date of Patent: Sep. 1, 2020

(54) FINGER VEIN IDENTIFICATION METHOD AND DEVICE

(71) Applicant: XIAMEN ZKTECO INFORMATION TECHNOLOGY CO., LTD., Fujian (CN)

(72) Inventors: Quanhong Che, Beijing (CN); Shukai Chen, Beijing (CN)

(73) Assignee: ZKTECO CO., LTD., Guangdong (CN)

( * ) Notice: Subject to any disclaimer, the term of this patent is extended or adjusted under 35 U.S.C. 154(b) by 144 days.

(21) Appl. No.: 15/767,176

(22) PCT Filed: Oct. 10, 2015

(86) PCT No.: PCT/CN2015/091630
§ 371 (c)(1),
(2) Date: Apr. 10, 2018

(87) PCT Pub. No.: WO2017/059591
PCT Pub. Date: Apr. 13, 2017

(65) Prior Publication Data
US 2018/0300571 A1     Oct. 18, 2018

(51) Int. Cl.
*G06K 9/00* (2006.01)
*G06K 9/32* (2006.01)
(Continued)

(52) U.S. Cl.
CPC ...... *G06K 9/00885* (2013.01); *G06K 9/00114* (2013.01); *G06K 9/3241* (2013.01);
(Continued)

(58) Field of Classification Search
None
See application file for complete search history.

(56) References Cited

U.S. PATENT DOCUMENTS

| 2008/0239335 | A1* | 10/2008 | Lee | H04N 19/176 |
| | | | | 358/1.6 |
| 2011/0188710 | A1* | 8/2011 | Muquit | G06K 9/00 |
| | | | | 382/115 |
| 2011/0304720 | A1 | 12/2011 | Kumar et al. | |

FOREIGN PATENT DOCUMENTS

| CN | 103310196 A | 9/2013 |
| CN | 103996038 A | 8/2014 |

(Continued)

OTHER PUBLICATIONS

Translation of NPL document 2 cited in IDS filed Apr. 10, 2018: 'PENG, Jialiang. "Research on key issues of multi-modal biometric verification based on finger," Electronic Technology & Information Science, China Doctoral Dissertations, No. 1, Jan. 15, 2015, pp. 21-43.' (Year: 2015).*

(Continued)

*Primary Examiner* — Sean M Conner
(74) *Attorney, Agent, or Firm* — Pillsbury Winthrop Shaw Pittman LLP

(57) ABSTRACT

A finger vein identification method and device used for effectively extracting finger vein identification characteristics to conduct finger vein identification. The method of the embodiments of the present teachings comprises: collecting a finger vein image, employing a line fitting method to extract a region of interest in the finger vein image, conducting geometric normalization and grayscale normalization processing of the region of interest to obtain a processed region, determining finger vein blood vessel lines in the processed region to obtain a finger vein blood vessel image, and conducting finger vein identification based on the finger vein blood vessel image.

26 Claims, 23 Drawing Sheets

(51) Int. Cl.
G06K 9/40 (2006.01)
G06K 9/42 (2006.01)
G06K 9/62 (2006.01)

(52) U.S. Cl.
CPC ............. *G06K 9/40* (2013.01); *G06K 9/42* (2013.01); *G06K 9/6203* (2013.01); *G06K 2009/00932* (2013.01)

(56) References Cited

FOREIGN PATENT DOCUMENTS

CN 105518716 A 4/2016
KR 101025666 B1 3/2011

OTHER PUBLICATIONS

Lin, Kunming, et al. "Feature level fusion of fingerprint and finger vein biometrics." International Conference in Swarm Intelligence. Springer, Berlin, Heidelberg, 2011. (Year: 2011).*
Huang, Beining et al., "Finger-vein Authentication Based on Wide Line Detector and Pattern Normalization", 2010 International Conference on Pattern Recognition, Aug. 26, 2010, pp. 1269-1272.
Peng, Jialiang, "Research on key issues of multi-modal biometric verification based on finger," Electronic Technology & Information Science, China Doctoral Dissertations, No. 1, Jan. 15, 2015, pp. 21-43.
International Search Report and Written Opinion dated Jul. 8, 2016.

* cited by examiner

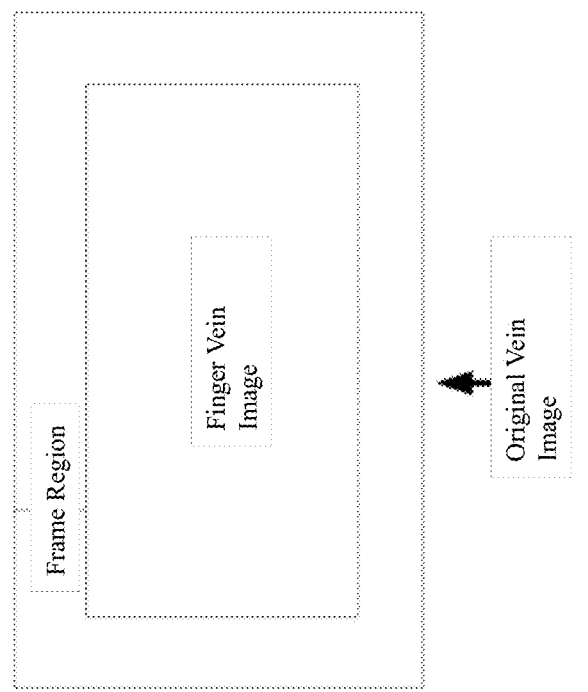

FINGER VEIN IDENTIFICATION METHOD AND DEVICE

CROSS-REFERENCE TO RELATED APPLICATION

The present application claim priority to International Patent Application No. PCT/CN2015/091630, filed on Oct. 10, 2015, the disclosure of which is incorporated herein by reference in its entirety.

BACKGROUND

Technical Field

The present teachings relates to a biometric identification technique, and more particularly, to a finger vein identification method and device.

2. Technical Background

Biometric identification techniques utilize the biometrics or behavioral characteristics of the human body, such as physical characteristics such as fingerprints, a shape of the palm, the iris, body odor, facial shape, and behavioral characteristics such as signatures, language, and gait, to verify an identity of an individual. Among these biometric identification techniques, fingerprint identification is commonly applied due to features such as a high degree of uniqueness, stability, and ease of use. However, a fingerprint is an external biometric. Fingerprint identification requires that a user keep the finger clean and smooth while recording the fingerprint. Any dirt or grim that is present on the fingerprint could render identification difficult. Further, fingerprints are easy to fake. There are even cloned fingerprints made of silicone. As a result, the security factor of fingerprint identification technology is relatively low.

Based on societal need, a new type of biometric identification technique has appeared in recent years—vein identification. Since the biometric is a pattern of blood flow, vein identification is essentially an "in vivo identification" biometric identification technique. That is to say, the target individual for identification corresponds to a living person in order to obtain a vein pattern for identity identification. This is difficult to fake or surgically alter, and the security factor is quite high. Vein identification primarily includes back-of-the-hand vein identification, palm vein identification, and finger vein identification. Of these, finger veins, just like fingerprints, have universality and high uniqueness. Thus, finger vein identification has become a new domain for developing biological identification in recent years.

In the process of finger vein identification, either transmitted light or reflected light is normally used to obtain a finger vein image. Subsequently, vein characteristics are extracted from the finger vein image. Characteristic matching is conducted to achieve finger vein identification and thus confirm an individual's identity.

Currently, the maturity and precision of finger vein identification techniques are lower than those of fingerprint identification are. This is primarily because the existing vein characteristic extraction and matching efficiency of finger vein images are low. As a result, the questions of how to extract finger vein characteristics and achieve matching are among the topics of research in finger vein characteristics.

SUMMARY

Given the above drawbacks, embodiments of the present teachings generally provide a finger vein identification method and device for use in effectively extracting finger vein identification characteristics for finger vein identification.

A first aspect of the present teachings corresponds to a finger vein identification method. This method comprises collecting a finger vein image; employing a line fitting method to extract a region of interest in the finger vein image; conducting geometric normalization and grayscale normalization processing of the region of interest to obtain a processed region; and determining finger vein blood vessel lines in the processed region to obtain a finger vein blood vessel image and conducting finger vein identification based on the finger vein blood vessel image.

A second aspect of the present teachings provides a device for identifying finger veins. In this aspect, the method comprises collecting module for collecting a finger vein image; a region extracting module for employing a line fitting method to extract a region of interest in the finger vein image; an image processing module for conducting geometric normalization and grayscale normalization processing of the region of interest to obtain a processed region and for determining finger vein blood vessel lines in the processed region to obtain a finger vein blood vessel image; and an identification module for conducting finger vein identification based on the finger vein blood vessel image.

It can be seen from the above technical solutions that, in embodiments of the present teachings, a finger vein image is first collected, a line fitting method is employed to extract a region of interest from the finger vein image, geometric normalization and grayscale normalization processing of the region of interest are conducted to obtain a processed region, and finger vein blood vessel lines are determined in the processed region. These finger vein blood vessel lines are finger vein identification characteristics, yielding a finger vein blood vessel image. Finger vein identification can then be conducted based on this finger vein blood vessel image. The embodiments of the present teachings, therefore, effectively extract finger vein identification characteristics for conducting finger vein identification.

BRIEF DESCRIPTION OF THE DRAWINGS

To more clearly describe the technical solution of the embodiments of the present teachings, a brief description of figures needed in the embodiments associated with the present teachings will be given below. As is readily apparent, the figures in the description given below are merely embodiments of the present teachings. A person having ordinary skill in the field of art would be able to obtain other figures based on these figures without engaging in creative effort.

FIG. 1A is a schematic drawing of an original vein image provided in accordance with an embodiment of the present teachings;

DETAILED DESCRIPTION

The technical solution in the embodiments of the present teachings will be clearly and completely described below in conjunction with the drawings of the embodiments of the present teachings. Clearly, the embodiments that are described are merely some, and not all, embodiments of the present teachings. Based on the embodiments of the present teachings, all other embodiments obtained by a person having ordinary skill in the field of art without engaging in creative effort would fall within the protective scope of the present teachings.

The embodiments of the present teachings provide a finger vein identification method. It is used to effectively extract finger vein identification characteristics for conducting finger vein identification. The embodiments of the present teachings further provide a corresponding finger vein identification device.

First, finger vein identification will be briefly described. The theory and basis of finger vein imaging is related to the concept that, since veins are closer to the skin than arteries, it is easier to read vein information when a finger is irradiated with infrared radiation. Vein blood vessel distribution is quite extensive, and its curvature and branching are quite complex. Thus, there are clear differences between individuals. The key to those differences relates to the high infrared radiation absorption rate of hemoglobin that has shed its deoxygenated parts and is being carried by red blood cells in blood flowing through the veins. This results in less transmission through vein portions, producing a vein image.

Based on the above theory, a corresponding system for collecting finger vein images was developed. The finger is placed in a collection position, irradiated with infrared light, and an original vein image is displayed on image sensors. The original vein image on the image sensors is stored. Subsequently, the original vein image is read from storage and processed.

Figure 1B:
FIG. 1B is a schematic drawing of a finger vein image in an application provided in accordance with an embodiment of the present teachings.

FIG. 1A corresponds to a schematic drawing of an original vein image provided in accordance with an embodiment of the present teachings. FIG. 1B corresponds to a schematic drawing of a finger vein image in an application provided in accordance with an embodiment of the present teachings. As seen from FIGS. 1A and 1B, the image sensors, in addition to being able to image a region, also include a frame region. This imaging region is the finger vein image provided in accordance with embodiments of the present teachings. Thus, the original vein image that is stored contains a finger vein image and a frame region. Based on the above, the technical solution of the present teachings will be described in detail through various embodiments.

Figure 2:
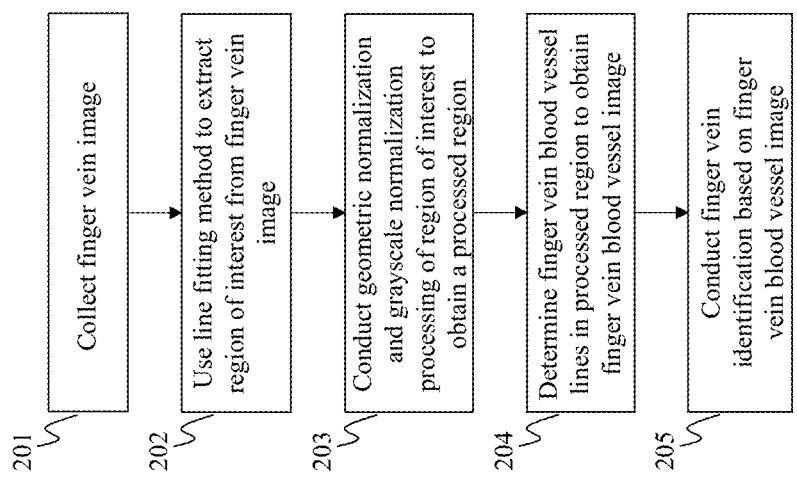
FIG. 2 is a schematic flowchart of the finger vein identification process provided in accordance with an embodiment of the present teachings.

FIG. 2 is a schematic flowchart of the finger vein identification process provided in accordance with an embodiment of the present teachings. As shown in FIG. 2, the finger vein identification process. The process may include, at step 201, collecting a finger vein image. Looking at FIG. 1B, the finger vein image provided does not contain the frame region as seen in FIG. 1A. At step 202, using a line fitting method, a region of interest from the finger vein image is extracted. The region of interest refers to a region that may be processed in the finger vein image. In the embodiment of the present teachings, this refers to the finger veins of interest. In this embodiment of the present teachings, a line fitting method is used to extract a region of interest from the finger vein image. The line fitting method consists of separately determining four edge lines of the region of interest in the finger vein image and then determining the region of interest from the four edge lines.

At 203, geometric normalization and grayscale normalization processing may be conducted on the region of interest to obtain a processed region. The region of interest, as determined at step 202, may not be a regular geometric image. To facilitate subsequent processing, the region of interest is subjected to geometric normalization and then subjected to grayscale normalization to obtain a processed region. At step 204, finger vein blood vessel lines in the processed region may be determined to obtain a finger vein blood vessel image. At step 205, finger vein identification may be conducted based on the finger vein blood vessel image.

It can be seen that a finger vein image is first collected. A line fitting method is used to extract a region of interest from the finger vein image, after which the region of interest is subjected to geometric normalization and grayscale normalization processing, yielding a processed region. Finger vein blood vessel lines are then determined within the processed region. These finger vein blood vessel lines are finger identification characteristics, which yields a finger vein blood vessel image. Finger vein identification can then be conducted based on the finger vein blood vessel image. This embodiment of the present teachings can effectively extract finger vein identification characteristics for conducting finger vein identification. The algorithms employed throughout the process are relatively simple, there is little calculation, and therefore the processing is rapid.

It can be understood that, as needed, once the finger vein blood vessel image has been obtained, the finger vein blood vessel image is processed to remove noise, effectively inhibiting the generation of more noise. It merits noting that since the width of a finger is generally not greater than the imaging region of the imaging sensors, and since the length of a finger is greater than the imaging region of the imaging sensors, in this embodiment of the present teachings, it may only be necessary to determine the fitting lines running along the top and bottom of the region of interest. The fitting lines may then be combined with lines running along the left side and right side of the finger vein image to determine the region of interest.

Figure 3A:
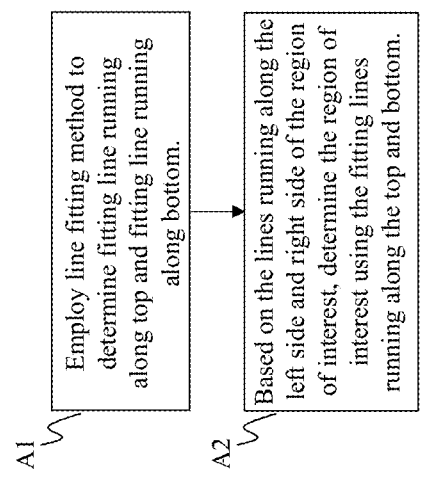
FIG. 3A is a schematic flowchart for determining a region of interest provided in accordance with an embodiment of the present teachings.

FIG. 3A is a schematic flowchart for determining a region of interest provided in accordance with an embodiment of the present teachings. FIG. 3A relates to step 202 of FIG. 2, as described above, and may further comprise the following steps. At step A1, a line fitting method may be used to determine fitting lines running along the top and bottom. At step A2, based on the lines running along the left side and right side of the region of interest, the region of interest using the fitting lines running along the top and bottom may be determined.

Figure 3B:
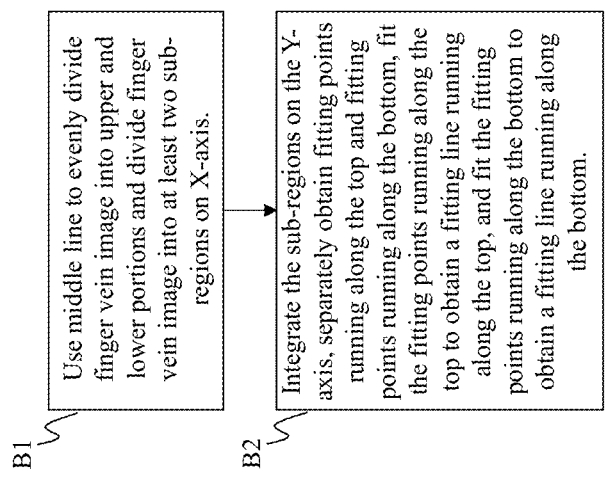
FIG. 3B is a schematic flowchart for determining a fitting line running along a top and a fitting line running along a bottom by a line fitting process, in accordance with an embodiment of the present teachings.

A number of embodiments of the present teachings provide a method of determining the fitting lines running along the top and bottom by means of a line fitting method. FIG. 3B is a schematic flowchart for determining a fitting line running along a top and a fitting line running along a bottom by a line fitting process, in accordance with an embodiment of the present teachings. As shown in FIG. 3B, the use of a line fitting method to determine the fitting lines running along the top and bottom comprises the following steps. At step B1, a middle line may be used to evenly divide the finger vein image into an upper portion and a lower portion and dividing the finger vein image into at least two sub-regions on the X-axis. At step B2, the sub-regions on the Y-axis may be integrated, thereby separately obtaining fitting points running along the top and fitting points running along the bottom, as well as fitting the fitting points running along the top to obtain a fitting line running along the top, and fitting the fitting points running along the bottom to obtain a fitting line running along the bottom.

It can be understood that the region of interest will fall entirely within the scope of the finger vein image. The middle line is used to evenly divide the finger vein image into an upper portion and a lower portion. That is, a portion in which the fitting line running along the top of the region of interest is at the top and a portion in which the fitting line running along the bottom is at the bottom. The grayscale values of each pixel within the region of interest are not less than the grayscale values of each pixel of the remaining scope of the region of interest with the finger vein image removed.

Figure 3C:
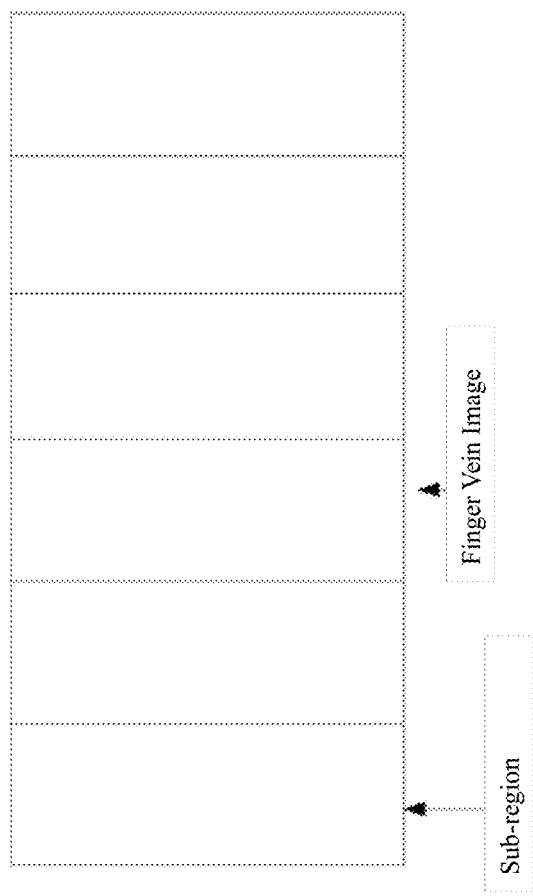
FIG. 3C is a schematic drawing of a finger vein image that has been divided into six sub-regions provided in accordance with an embodiment of the present teachings.
Figure 3D:
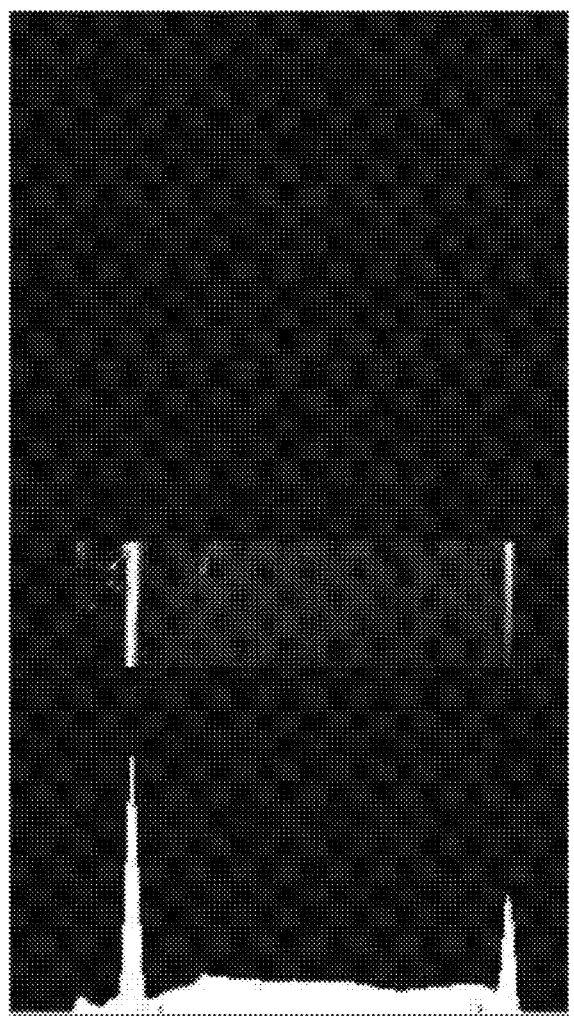
FIG. 3D is an edge response graph of a sub-region, which is integrated on the Y-axis, provided in accordance with an embodiment of the present teachings.
Figure 3E:
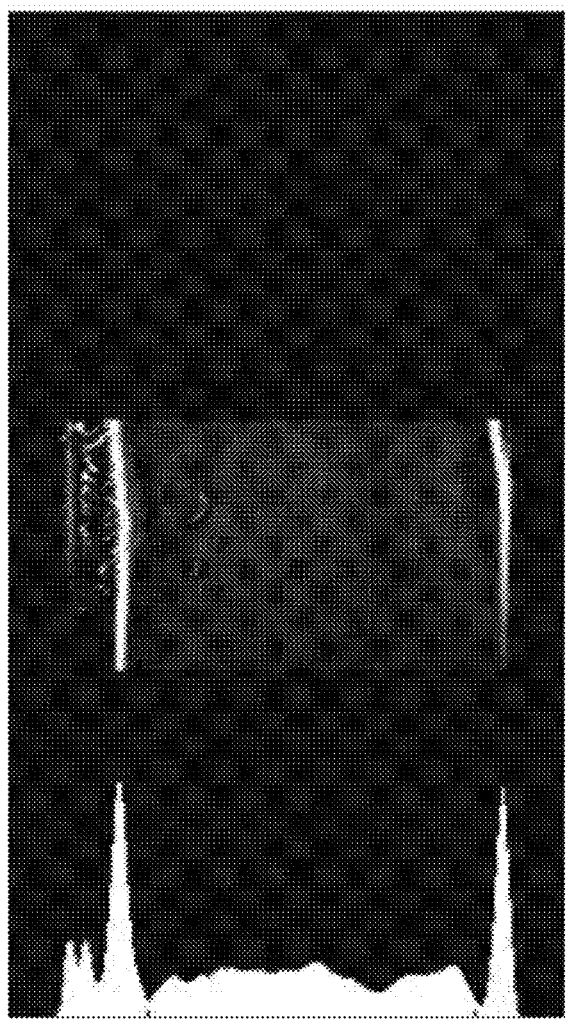
FIG. 3E is an edge response graph of two sub-regions, which is integrated on the Y-axis, provided in accordance with an embodiment of the present teachings.

For example, looking at FIGS. 3C-3E, the middle line divides the finger vein image into two portions. The finger vein image is then divided into at least two sub-regions on the X-axis (six sub-regions in the example of FIG. 3C). These sub-regions are denoted as sub-regions $x_0$ to $x_6$. Of these, each sub-region is integrated on the Y-axis. An array is obtained following integration. Each array forms a line on the image display. The formula $Y[j+2]+Y[j+1]-Y[j]-Y[j-1]$ is then used to calculate the difference of the integral value of the upper half portion. The position of a maximum value of the difference of integral value represents the upper boundary of the vein, which is adopted as a Y coordinate, and the center of the horizontal segment is the X coordinate. Six upper edge points are separately obtained. Formula (1), as seen below, is used to fit a line to these six upper edge points. Similarly, the formula $Y[j]+Y[j-1]-Y[j+2]-Y[j+1]$ is used to calculate the difference of integral value of the lower half portion. This yields six lower edge points. Formula (1) below is used to fit a line to these six lower edge points.

The least squares method line fitting equation of pixels $(x_i, y_j)$ is:

$$y = a + bx \qquad \text{(Formula 1)}.$$

Here, $$a = \frac{\sum x_i y_i - \sum y_i \sum x_i^2}{(\sum x_i)^2 - n\sum x_i^2} \quad b = \frac{\sum x_i \sum y_i - n \sum x_i y_i}{(\sum x_i)^2 - n\sum x_i^2}. \qquad \text{(Formula 2)}$$

For example, as shown in FIG. 3D, a single sub-region (shown in the middle of FIG. 3D) among six sub-regions is integrated on the Y-axis. An edge response diagram integrated on the Y-axis for this sub-region is shown on the left. In this description, a y array is obtained by integration. Thus, the display on the image is like the white portion on the left. As shown in FIG. 3E, two sub-regions (shown in the middle of FIG. 3E) of the six sub-regions are integrated on the Y-axis. An edge response diagram integrated on the Y-axis for these two sub-regions is shown on the left. Continuing in this fashion, six peaks along the top are separately selected for line fitting, yielding a fitting line running along the top. Six minimum points are selected along the bottom for line fitting, yielding a fitting line running along the bottom.

To enhance the fitting robustness, the fitting correlation can be calculated. If the correlation between the six points selected is poor, the fitting can be done over. In this process, Formula (3), as seen below, can be used to calculate the correlation between the six points:

$$r = \frac{n\sum x_i y_i - \sum x_i \sum y_i}{\sqrt{n\sum x_i^2 - (\sum x_i)^2} \sqrt{n\sum y_i^2 - (\sum y_i)^2}}. \qquad \text{(Formula 3)}$$

Figure 3F:
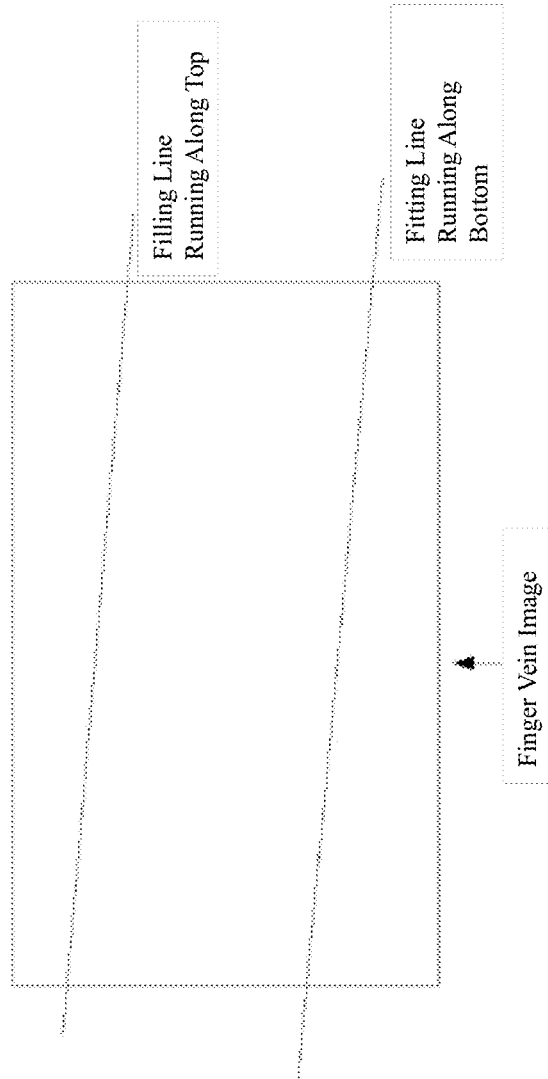
FIG. 3F is a fitting line schematic provided in accordance with an embodiment of the present teachings.
Figure 3G:
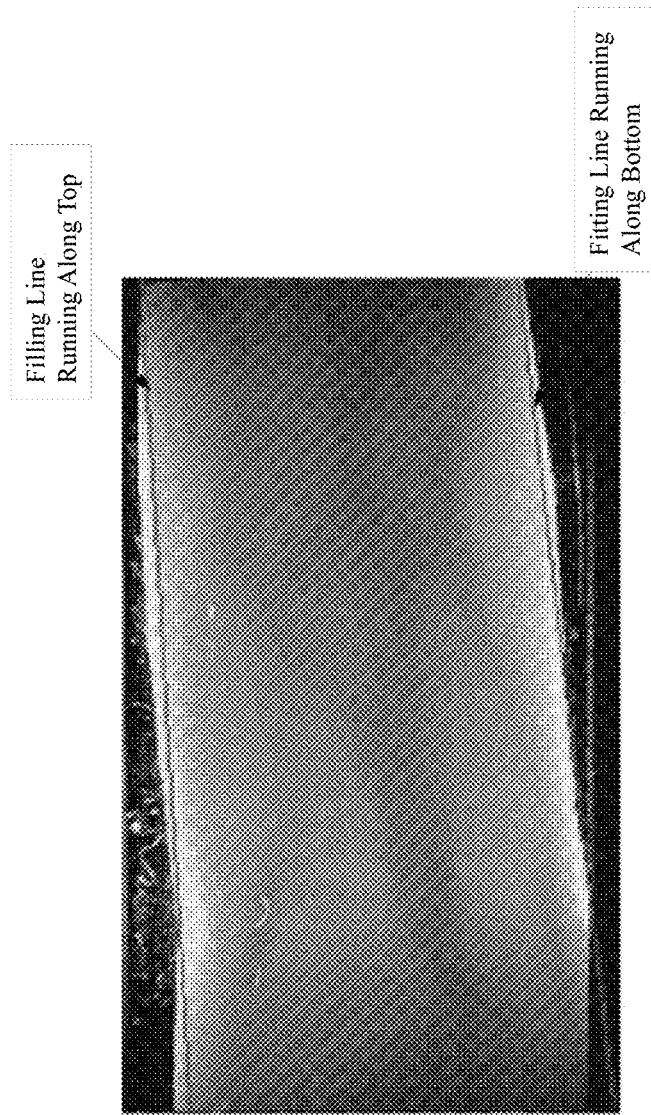
FIG. 3G is an application schematic of a fitting line provided in accordance with an embodiment of the present teachings.

Referring to FIG. 3F, a region of interest is shown. The region of interest may be obtained by using the fitting line running along the top and the fitting line running along the bottom obtained by the above method to divide the finger vein image and then combining these with the line running along the left side and the line running along the right side of the finger vein image. Referring to FIG. 3G, a schematic of a region of interest is shown. The region of interest may be obtained by division using the fitting line running along the top and the fitting line running along the bottom fitted by the above described method, and then the fitting line running along the top and the fitting line running along the bottom based on FIG. 1B.

Figure 4A:
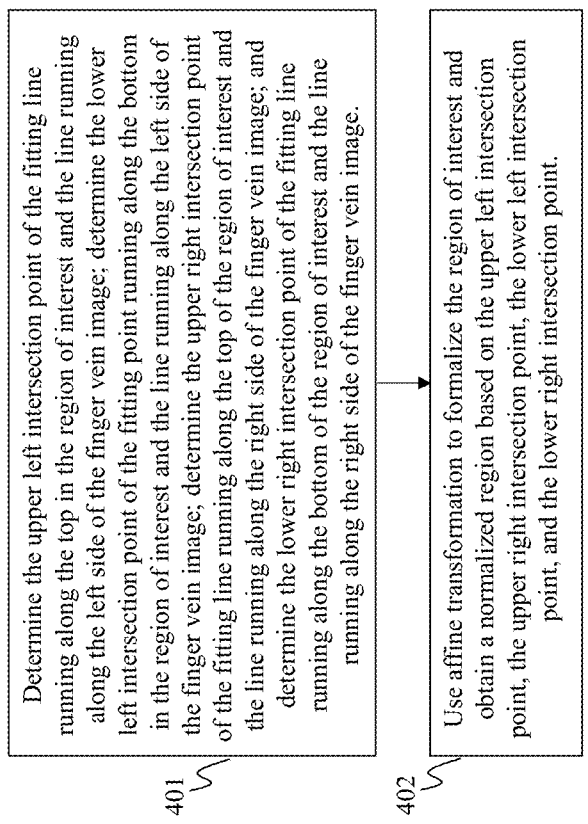
FIG. 4A is a schematic flowchart of a regional normalization process provided in accordance with an embodiment of the present teachings.

In a number of the embodiments of the present teachings, step 203 of FIG. 2 as described above, may include: using an affine transformation to regionally normalize the region of interest and obtain a normalized region, using ellipse transformation to geometrically normalize the normalized region and obtain a geometrized region, and using grayscale normalization processing on the geometrized region to obtain a processed region. In this process, corresponding to a number of embodiments of the present teachings, as shown in FIG. 4A, the above-mentioned affine transformation may be used to regionally normalize the region of interest and obtain a normalized region. This process may include, step 401, determining an upper left intersection point of the fitting line running along the top in the region of interest and the line running along the left side of the finger vein image, determining a lower left intersection point of the fitting point running along the bottom in the region of interest and the line running along the left side of the finger vein image, determining an upper right intersection point of the fitting line running along the top of the region of interest and the line running along the right side of the finger vein image, and determining a lower right intersection point of the fitting line running along the bottom of the region of interest and the line running along the right side of the finger vein image. At step 402, based on the upper left intersection point, the upper right intersection point, the lower left intersection point, and the lower right intersection point, normalization may be conducted and a normalized region may be obtained using affine transformation on the region of interest.

In this process, determining the upper left intersection point of the fitting line running along the top in the region of interest and the line running along the left side of the finger vein image, and determining of the lower left intersection point of the fitting point running along the bottom in the region of interest and the line running along the left side of the finger vein image, may comprise: determining a first starting point on the line running along the left side in the finger vein image, and based on this first starting point, determining the upper left intersection point and the lower left intersection point. Here, a distance from the first starting point to the fitting line running along the top of the region of interest may be equal to a distance from the first starting point to the fitting line running along the bottom of the region of interest.

The abovementioned determination of the upper right intersection point of the fitting line running along the top of the region of interest and the line running along the right side of the finger vein image, and the determination of the lower right intersection point of the fitting line running along the bottom of the region of interest and the line running along the right side of the finger vein image, may comprise determining a first ending point on the line running along the right side of the finger vein image, and based on this first ending point, determining the upper right intersection point and the lower right intersection point. Here, a distance from the first ending point to the fitting line running along the top of the region of interest may be equal to a distance from the first ending point to the fitting line running along the bottom of the region of interest.

In an embodiment of the present teachings, based on finding the starting point on the line running along the left side of the finger vein image, the distance between the fitting line running from the starting point along the top is equal to the distance from the first starting point to the fitting line running along the bottom. The distance from point (x1, y1) to the line y=ax+b is calculated using the formula:

$$d = \frac{|a + bx1 - y1|}{\sqrt{1 + b^2}}.$$

Figure 4B:
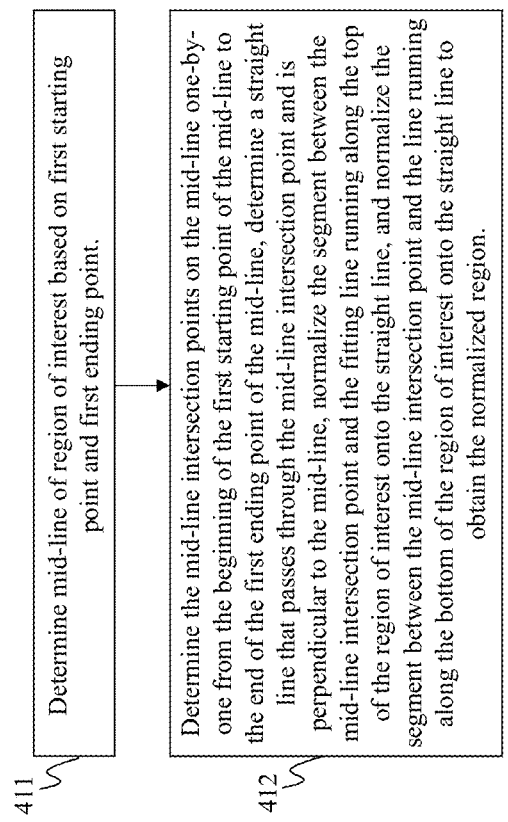
FIG. 4B is another schematic flowchart of a regional normalization process provided in accordance an embodiment of the present teachings.

In a number of embodiments of the present teachings, as shown in FIG. 4B, step 402 of FIG. 4A may comprises, at step 411, determining a mid-line of the region of interest based on the first starting point and the first ending point. At step 412, mid-line intersection points on the mid-line may be determined one-by-one from the beginning of the first starting point of the mid-line to the end of the first ending point of the mid-line. A straight line that passes through the mid-line intersection point and is perpendicular to the mid-line may be determined, the segment between the mid-line intersection point and the fitting line running along the top of the region of interest onto the straight line may be normalized, and the segment between the mid-line intersection point and the line running along the bottom of the region of interest onto the straight line may be normalized to obtain a normalized region.

Figure 4C:
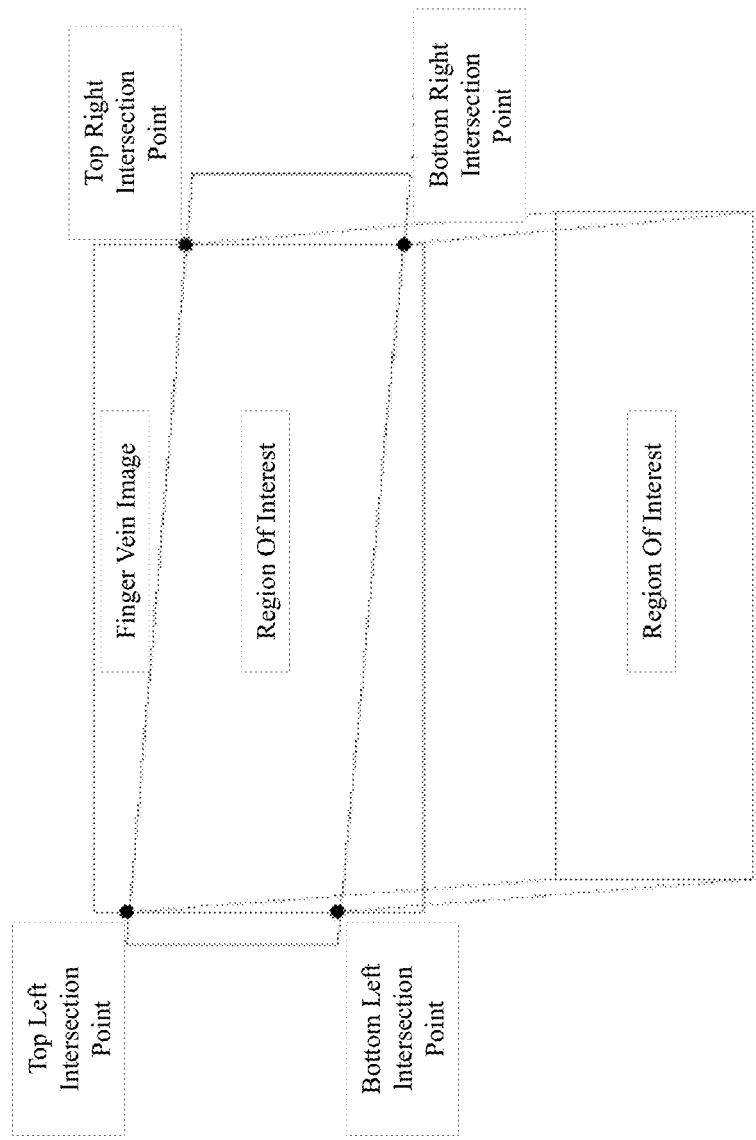
FIG. 4C is another schematic flowchart of a regional normalization process provided in accordance with an embodiment of the present teachings.
Figure 4D:
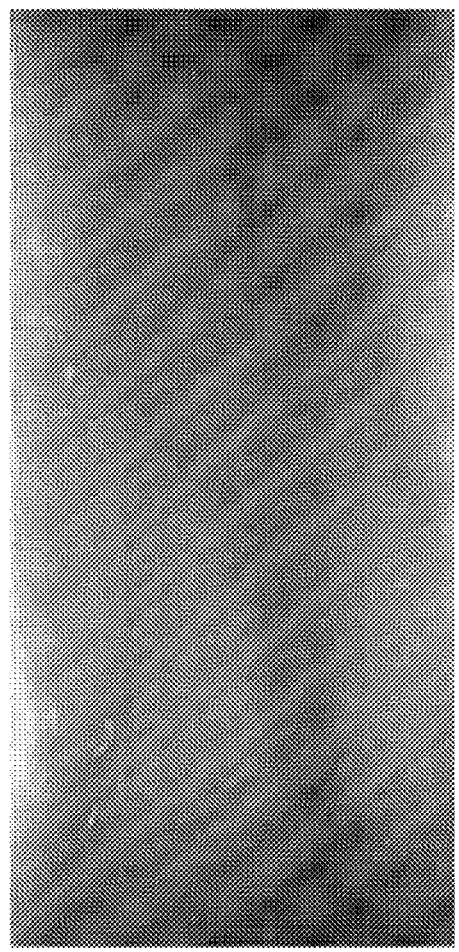
FIG. 4D is an application schematic of a normalized region provided in accordance a number of embodiments of the present teachings.

FIG. 4C is another schematic flowchart of a regional normalization process provided in accordance with an embodiment of the present teachings. FIG. 4D is an application schematic of a normalized region provided in accordance a number of embodiments of the present teachings. Referring to FIG. 4C, a corresponding relation between the upper left intersection point, upper right intersection point, lower left intersection point, and lower right intersection point prior to normalization processing and the upper left intersection point, upper right intersection point, lower left intersection point, and lower right intersection point following normalization is shown. A rectangular normalized region is obtained following normalization. FIG. 4D shows a normalized region following the normalization processing, as described above with reference to FIG. 3F.

Figure 5A:
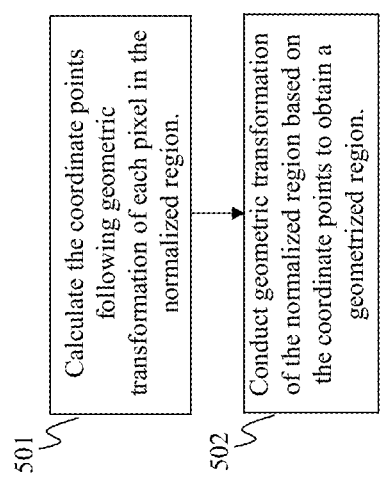
FIG. 5A is a schematic flowchart of geometric normalization provided in accordance with a number of embodiments of the present teachings.

As shown in FIG. 5A, ellipse transformation may be used to geometrically normalize the normalized region and obtain a geometrized region. This may include, at step 501, calculating coordinate points following geometric transformation of each pixel in the normalized region. At step 502, a geometric transformation of the normalized region may be conducted based on the coordinate points to obtain a geometrized region. It merits noting that, generally, the finger has an elliptic shape. When projecting the image of an elliptic finger onto a plane, the resolution of the image of the edge contours of the finger will be low, and the resolution of the image of the center of the finger contours will be high. Thus, it is necessary to correct this through ellipse transformation.

Figure 5B:
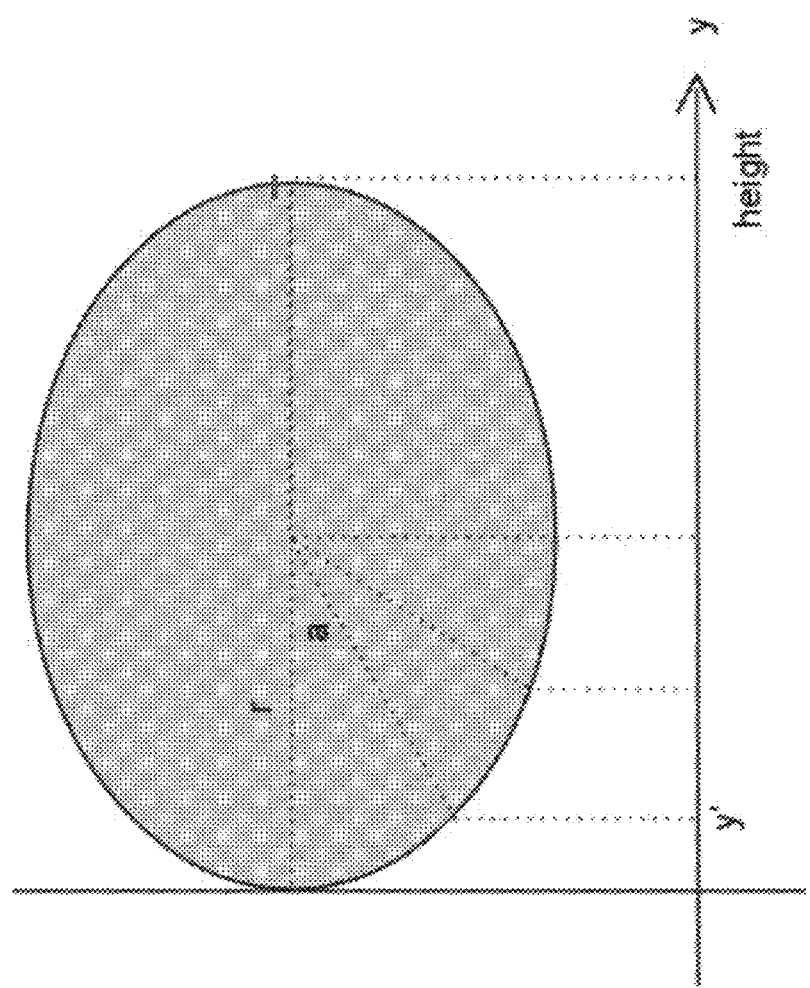
FIG. 5B is a finger projection schematic provided in accordance with a number of embodiments of the present teachings.

FIG. 5B is a finger projection schematic provided in accordance with a number of embodiments of the present teachings. Referring to FIG. 5B, a finger image schematic provided in accordance an embodiment of the present teachings is shown. In FIG. 5B, r denotes the radius of the finger ellipse. The imaging position of the finger surface is evenly displaced from one side to the other. The angle a formed between the line connecting the center of the finger to this point and the horizontal direction increases evenly from 0 to 180 degrees. The projection y' of this point on the Y-axis increases from 0 to the height. As a result, the resolution of the image along the finger contour edges is relatively low, and the resolution of the image at the center of the finger contours is relatively high. The image resolution is thus not uniform.

A correction formula (4) derived based on FIG. 5B is:

$$r = \frac{\text{height}}{2}$$
$$y' = r\left(1 - \cos\frac{a\pi}{180}\right), a \in [1, 180].$$
(Formula 4)

In formula (4), the height corresponds to the height of a certain pixel in the geometrized region after correction. It can be understood that a white image of the geometrized region is first determined during geometric normalization. The height and width of this white image have already been determined. Subsequently, for any single pixel within the normalized region, in the corresponding white image, the height in the white image of a given point is assumed to be the height, and angle a is obtained based on a change in height. The value of r is calculated from formula (4), as seen above. The y-coordinate of the pixel is then calculated from r and a. In this process, the resolution of the geometrized region may be 180×180.

Figure 6A:
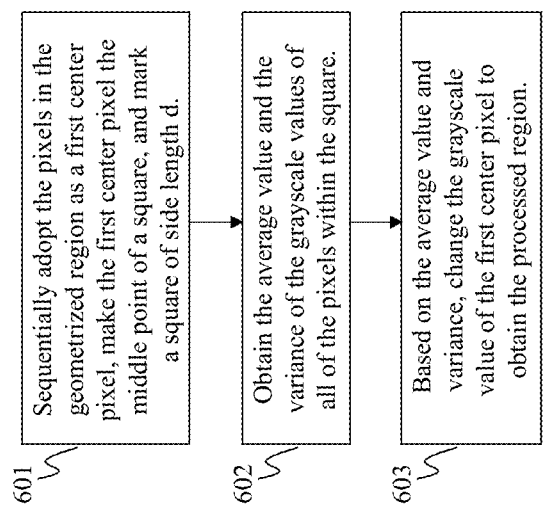
FIG. 6A is a schematic of a flowchart of grayscale normalization provided in accordance with a number of embodiments of the present teachings.

FIG. 6A is a schematic of a flowchart of grayscale normalization provided in accordance with a number of embodiments of the present teachings. As shown in FIG. 6A, in a number of embodiments of the present teachings, grayscale normalization processing may be used on the geometrized region to obtain the processed region. This may include, at step 601, sequentially adopting each pixel in the geometrized region as a first center pixel, making the first center pixel the middle point of a square, and marking a square of side length d. At step 602, an average value and a variance of the grayscale values of all of the pixels within the square may be obtained. At step 603, based on the average value and variance, the grayscale value of the first center pixel may be changed to obtain a processed region.

In the above-mentioned process, m is calculated as the average value of the grayscale values of all pixels within the square, and v denotes the variance. The transformation formula (5) for obtaining the grayscale value of the first center pixel is:

$$\text{gray}=(\text{gray}-m)\times v0/v+m0$$ (Formula 5).

In formula (5), v0 denotes the original variance of the first center pixel and m denotes the original grayscale value of the first center pixel.

Figure 6B:
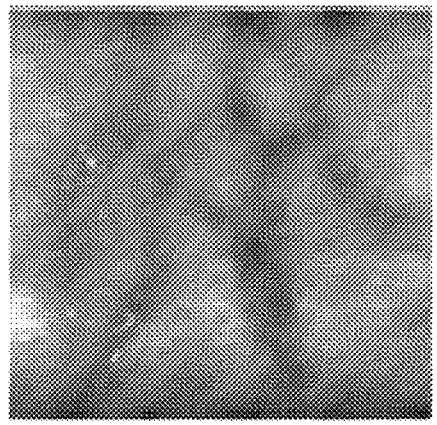
FIG. 6B is a schematic diagram of a finger vein blood vessel image provided in accordance with a number of embodiments of the present teachings.

FIG. 6B is a schematic diagram of a finger vein blood vessel image provided in accordance with a number of embodiments of the present teachings. Based on FIG. 4C, FIG. 6B shows a processed region obtained by subjecting the normalized region to geometrization processing and then conducting grayscale processing.

Figure 7A:
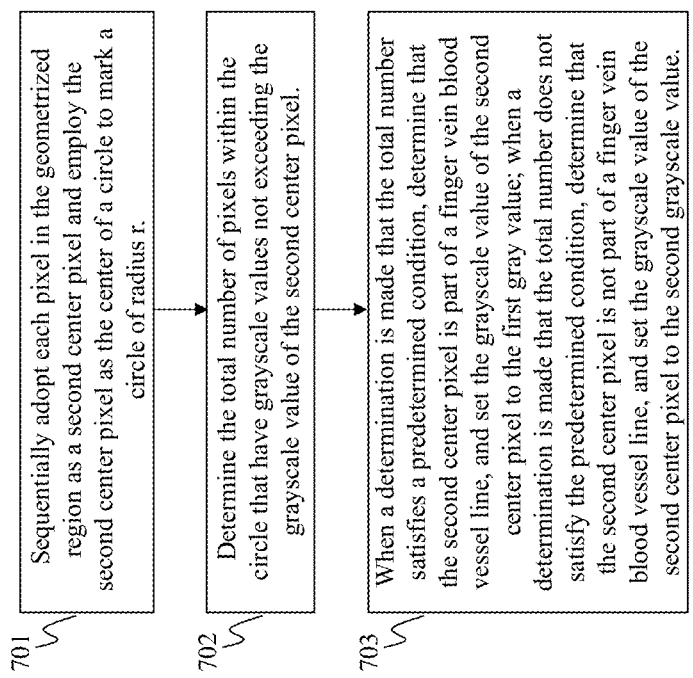
FIG. 7A is a schematic flowchart of the method of determining finger vein blood vessel lines provided in accordance with a number of embodiments of the present teachings.

FIG. 7A is a schematic flowchart of the method of determining finger vein blood vessel lines provided in accordance with a number of embodiments of the present teachings. As shown in FIG. 7A, the finger vein blood vessel lines in the processed region may be determined. This may include, at step 701, sequentially adopting each pixel in the geometrized region as a second center pixel and employing the second center pixel as the center of a circle to mark a circle of radius r. At step 702, the total number of pixels within the circle that have grayscale values not exceeding the grayscale value of the second center pixel may be determined. At step 703, when a determination is made that the total number satisfies a predetermined condition, it may be determined that the second center pixel is part of a finger vein blood vessel line, and the grayscale value of the second center pixel may be set to the first grayscale value. Further, when a determination is made that the total number does not satisfy the predetermined condition, it may be determined that the second center pixel is not part of a finger vein blood vessel line, and the grayscale value of the second center pixel may be set to a second grayscale value. In this process, when the first grayscale value is 255, the second grayscale value is 0, and when the first grayscale value is 0, the second grayscale value is 255. Additionally in this process, when the grayscale value is 255, it means that the color of that pixel is white. When the grayscale value is 0, it means that the color of that pixel is black.

In the above-referenced process, the following operations may be conducted on each pixel in the processed region: making the pixel a second center pixel, using this second center pixel to mark out a circle of radius r in the processed region, defining a variable L, initializing variable L as 0, and then calculating the grayscale values of pixels within the circle other than the second center pixel. If the grayscale value of some other pixel among the other pixels is calculated not to exceed the grayscale value of the second center pixel, the value of L is incremented by 1. This operation is repeated to calculate the grayscale values of all other pixels within the circle. After this occurs, a determination is made as to whether L satisfies a predetermined condition. For instance, L may correspond to a ratio to all the pixels within the circle (including the second center pixel). If the ratio is not less than 0.472, the second center pixel is determined to be part of a vein blood vessel line. If, however, the second center pixel is part of a vein blood vessel line, the grayscale value of the second center pixel is set to the first grayscale value. If the second center pixel is not part of a vein blood vessel line, the grayscale value of the second center pixel is set to the second grayscale value. As an alternative mode, when the second center pixel is part of a vein blood vessel line, the grayscale value of the second center pixel is set to 255 (white). When the second center pixel is not part of a vein blood vessel line, the grayscale value of the second center pixel is set to 0 (black).

Figure 7B:
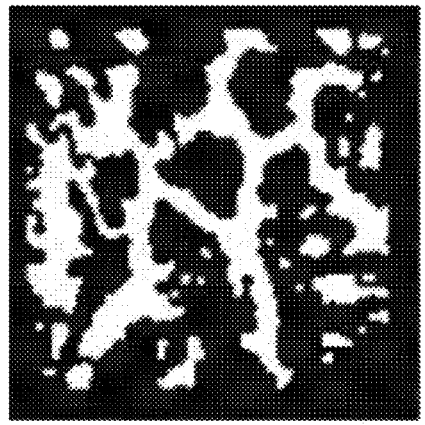
FIG. 7B is a schematic of a finger vein blood vessel image provided in accordance with a number of embodiments of the present teachings.

FIG. 7B is a schematic of a finger vein blood vessel image provided in accordance with a number of embodiments of the present teachings. FIG. 7B is a finger vein blood vessel image obtained by extracting vein blood vessel lines based on the above-referenced FIG. 6B.

Figure 8:
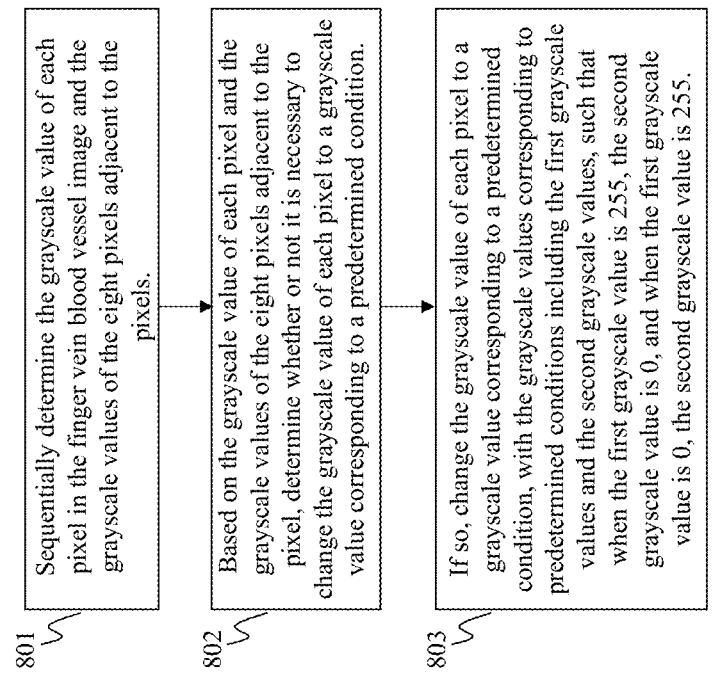
FIG. 8 is a schematic flowchart of a noise removal process provided in accordance with a number of embodiments of the present teachings.

FIG. 8 is a schematic flowchart of a noise removal process provided in accordance with a number of embodiments of the present teachings. As shown in FIG. 8, noise removal processing may be conducted on the finger vein blood vessel image provided by this embodiment of the present teachings. This may include, at step 801, sequentially determining the grayscale value of each pixel in the finger vein blood vessel image and the grayscale values of the eight pixels adjacent to each pixel. It can be understood that the pixels in the finger vein blood vessel image are arranged in a rectangle, so pixels are present in eight positions adjacent to a given pixel. At step 802, based on the grayscale value of each pixel and the grayscale values of the eight pixels adjacent to it, it may be determined whether or not it is necessary to change the grayscale value of the pixel to a grayscale value corresponding to a predetermined condition. If so, at step 803, the grayscale value of the pixel may be changed to a grayscale value corresponding to a predetermined condition, with the grayscale values corresponding to predetermined conditions including a first grayscale value and a second grayscale value, such that when the first grayscale value is 255, the second grayscale value is 0, and when the first grayscale value is 0, the second grayscale value is 255.

In the above-referenced process, the predetermined conditions correspond to: if the grayscale value of the pixel is the first grayscale value, and the grayscale value of the pixel to the left of the pixel and the grayscale value of the pixel to the right of the pixel are both the second grayscale value, the grayscale value of the pixel is changed to the second grayscale value. Alternatively, if the grayscale value of the pixel is the first grayscale value and the total number of pixels of the first grayscale value among the eight pixels adjacent to the pixel is not greater than five, the grayscale value of the pixel is changed to the second grayscale value. For example, assuming that the pixels that are part of vein blood vessel lines in the finger vein blood vessel image are set to white, and pixels that are not part of vein blood vessel lines are set to black, the above preset conditions correspond to the following four conditions:

(i) If both the pixel to the left and the pixel to the right of a given white pixel are black, that pixel is changed to black;

(ii) If both the pixel to the left and the pixel to the right of a given black pixel are white, that pixel is changed to white;

(iii) If fewer than five of the pixels among the eight pixels adjacent to a white pixel are white, that pixel is changed to black; and (iv) If fewer than five of the pixels among the eight pixels adjacent to a black pixel are black, that pixel is changed to white.

In the embodiments of the present teachings, the finger vein blood vessel image obtained by the method set forth above can serve as a finger vein template and be stored in a database. When subsequently conducting finger vein identification, the above method can be used to once again obtain the finger vein blood vessel image that has been identified. The finger vein template can be compared to the finger vein blood vessel image that has been identified to conduct matching identification. Alternatively, finger vein templates can be stored in a database, and finger vein blood vessel images that are obtained, along with the finger vein templates in the database, can be used to conduct matching identification.

In the above situations, the finger vein identification that is conducted based on finger vein blood vessel images and that is provided in embodiments of the present teachings. This may include determining the total number Wab of pixels that are part of vein blood vessel lines at a same coordinate position in the finger vein blood vessel image and in another finger vein blood vessel image; calculating the total number Wa of pixels that are part of vein blood vessel lines in the finger vein blood vessel image and the total number Wb of pixels that are part of vein blood vessel lines in the other finger vein blood vessel image; calculating a matching rate based on total number Wab, total number Wa, and total number Wb; determining whether the matching rate satisfies a predetermined condition; and if so, identifying a match between the finger veins of the finger vein blood vessel image and the finger veins of the other finger vein blood vessel image.

For example, given finger vein blood vessel images a and b, finger vein blood vessel images a and b are first restored to binary black and white images 64×64 pixels in size. The matching method may then be described. Assuming that, in the processing steps, the grayscale value of pixels that are part of vein blood vessel lines is changed to 255 (that is, white), the total number Wa of pixels with a grayscale value of 255 in finger vein blood vessel image a is calculated. Similarly, the total number Wb of pixels with a grayscale value of 255 in finger vein blood vessel image b is calculated. The total number Wab of pixels all having a grayscale value of 255 in finger vein blood vessel images a and b is calculated to conduct matching identification using Formula (6) described below:

$$S = \frac{200\ W_{ab}}{W_a + W_b}. \quad \text{(Formula 6)}$$

In formula (6), S is the matching rate. If the matching rate is not less than a certain value, finger vein blood vessel images a and b can be determined to be a match.

Figure 9:
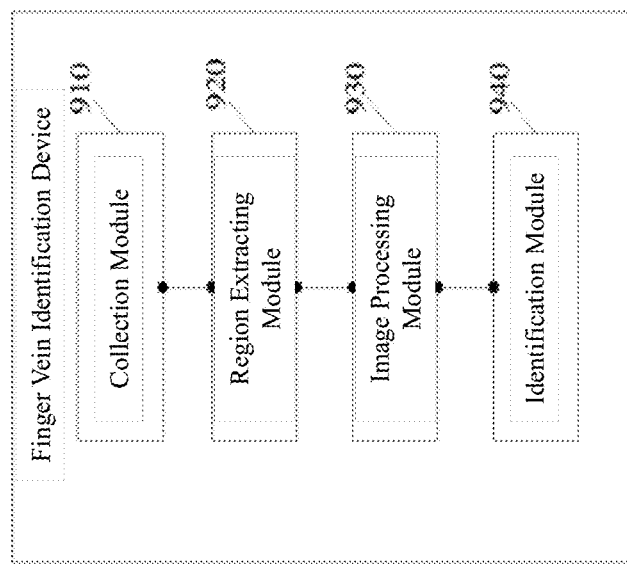
FIG. 9 is a structural schematic of the noise removal processing process provided in accordance with a number of embodiments of the present teachings.

FIG. 9 is a structural schematic of the noise removal processing process provided in accordance with a number of embodiments of the present teachings. As shown in FIG. 9, a finger vein identification device may include: a collecting module 910 for collecting a finger vein image; a region extracting module 920 for employing a line fitting method to extract a region of interest in the finger vein image; an image processing module 930 for conducting geometric normalization and grayscale normalization processing of the region of interest to obtain a processed region and determining finger vein blood vessel lines in the processed region to obtain a finger vein blood vessel image; and an identification module 940 for conducting finger vein identification based on the finger vein blood vessel image.

In this embodiment, collecting module 910 collects a finger vein image. Region extracting module 920 uses a line fitting process to extract a region of interest from the finger vein image. Subsequently, image processing module 930 conducts geometric normalization and grayscale normalization processing on the region of interest obtained by region extracting module 920, yielding a processed region. It then determines finger vein blood vessel lines in the processed region. These finger vein blood vessel lines are finger vein identification characteristics. It then obtains a finger vein blood vessel image. Identification module 940 can then conduct finger vein identification based on the finger vein blood vessel image. This embodiment of the present teachings can effectively extract finger vein identification characteristics for conducting finger vein identification.

Figure 10:
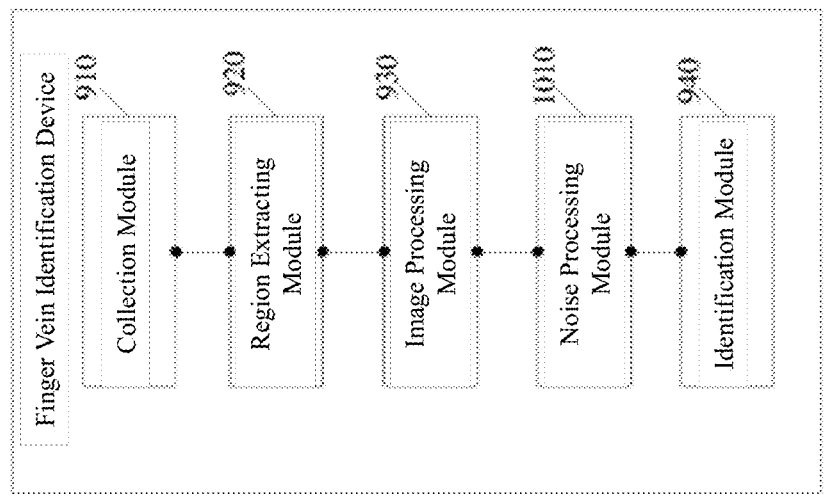
FIG. 10 is a structural schematic of a finger vein identifying device provided in accordance with an embodiment of the present teachings.

FIG. 10 is a structural schematic of a finger vein identifying device provided in accordance with an embodiment of the present teachings. In a number of embodiments of the present teachings, the finger vein identification device provided by embodiments of the present teachings further comprises a noise processing module 1010, as shown in FIG. 10. Noise processing module 1010 is used to conduct noise removal processing of the finger vein blood vessel image obtained by image processing module 930 prior to identification module 940 conducting finger vein identification based on the finger vein blood vessel image.

In a number of embodiments of the present teachings, region extracting module 920 is used to employ a line fitting method to determine a fitting line running along the top and a fitting line running along the bottom. Based on a line running along the left side and a line running along the right side in the region of interest, the fitting line running along the top and the fitting line running along the bottom determine the region of interest.

In a number of embodiments of the present teachings, region extracting module 920 is used to employ a middle line to divide the finger vein region equally into upper and lower portions, and to divide the finger vein image into at least two sub-regions on the X-axis. The sub-regions are integrated on the Y-axis to separately obtain the fitting points of the above-described lines running along the top and bottom. The fitting points running along the top are fitted to obtain the fitting line running along the top, and the fitting points running along the bottom are fitted to obtain the fitting line running along the bottom.

In a number of embodiments of the present teachings, image processing module 930 is used for conducting affine transformation of the region of interest to conduct regional normalization to obtain a normalized region, for conducting elliptical transformation of the normalized region to conduct geometric normalization to obtain a geometrized region, and for conducting grayscale normalization processing of the geometrized region to obtain a processed region.

In a number of embodiments of the present teachings, image processing module 930 is used for determining the upper left intersection point of the fitting line running along the top of the region of interest and the line running along the left side of the finger vein image; determining the lower left intersection point of the fitting point running along the bottom of the region of interest and the line running along the left side of the finger vein image; determining the upper right intersection point of the fitting line running along the top of the region of interest and the line running along the right side of the finger vein image; determining the lower right intersection point of the fitting line running along the bottom of the region of interest and the line running along the right side of the finger vein image; and based on the upper left intersection point, the upper right intersection point, the lower left intersection point, and the lower right intersection point, using affine transformation on the region of interest to conduct normalization and obtain a normalized region.

In a number of embodiments of the present teachings, image processing module 930 is used for determining the first starting point on the line running along the left side in the finger vein image, and based on this first starting point, determining the upper left intersection point and the lower left intersection point, with the distance from the first starting point to the fitting line running along the top of the region of interest being equal to the distance from the first starting point to the fitting line running along the bottom of the region of interest; and determining the first ending point on the line running along the right side of the finger vein image, and based on this first ending point, determining the upper right intersection point and the lower right intersection point, with the distance from the first ending point to the fitting line running along the top of the region of interest being equal to the distance from the first ending point to the fitting line running along the bottom of the region of interest.

In a number of embodiments of the present teachings, image processing module 930 is used for determining the mid-line of the region of interest based on the first starting point and the first ending point; determining the mid-line intersection points on the mid-line one-by-one from the beginning of the first starting point of the mid-line to the end of the first ending point of the mid-line; and determining a straight line that passes through the mid-line intersection point and is perpendicular to the mid-line, normalizing the segment between the mid-line intersection point and the fitting line running along the top of the region of interest onto the straight line and normalizing the segment between the mid-line intersection point and the line running along the bottom of the region of interest onto the straight line to obtain a normalized region.

In a number of embodiments of the present teachings, image processing module 930 is further used for calculating the coordinate points following geometric transformation of each pixel in the normalized region and for conducting geometric transformation of the normalized region based on the coordinate points to obtain a geometrized region.

In a number of embodiments of the present teachings, image processing module 930 is further used for sequentially adopting each pixel in the geometrized region as a first center pixel, making the first center pixel the middle point of a square, and marking a square of side length d; obtaining the average value and the variance of the grayscale values of all of the pixels within the square; and based on the average value and variance, changing the grayscale value of the first center pixel to obtain a processed region.

In a number of embodiments of the present teachings, image processing module 930 is further used for sequentially adopting each pixel in the geometrized region as a second center pixel and employing the second center pixel as the center of a circle to mark a circle of radius r; determining the total number of pixels within the circle that have grayscale values not exceeding the grayscale value of the second center pixel; determining that the second center pixel is part of a finger vein blood vessel line when a determination is made that the total number satisfies a predetermined condition and setting the grayscale value of the second center pixel to the first grayscale value; determining that the second center pixel is not part of a finger vein blood vessel line when a determination is made that the total number does not satisfy the predetermined condition and setting the grayscale value of the second center pixel to a second grayscale value, such that when the first grayscale value is 255, the second grayscale value is 0, and when the first grayscale value is 0, the second grayscale value is 255.

In a number of embodiments of the present teachings, noise processing module 1010 is used for sequentially determining the grayscale value of each pixel in the finger vein blood vessel image and the grayscale values of the eight pixels adjacent to the pixels; determining whether or not it is necessary to change the grayscale value of each pixel to grayscale values corresponding to a predetermined condition based on the grayscale value of the pixel and the grayscale values of the eight pixels adjacent to the pixel; and if so, changing the grayscale value of each pixel to grayscale values corresponding to predetermined conditions, with the grayscale values corresponding to predetermined conditions including a first grayscale value and a second grayscale value, such that when said first grayscale value is 255, the second grayscale value is 0, and when the first grayscale value is 0, the second grayscale value is 255.

In this process, the predetermined conditions are such that when the grayscale value of the pixel is the first grayscale value, and the grayscale values of the pixels on the left and right sides of the pixel are both the second grayscale value, the grayscale value of the pixel is changed to the second grayscale value; or when the grayscale value of the pixel is the first grayscale value and the total number of pixels with the grayscale value of the first grayscale value among the eight pixels adjacent to the pixel is not greater than five, the grayscale value of the pixel is changed to the second grayscale value.

In a number of embodiments of the present teachings, identification module 940 is used for determining the total number Wab of pixels that are part of vein blood vessel lines at the same coordinate positions in the finger vein blood vessel image and in another finger vein blood vessel image; calculating the total number Wa of pixels that are part of vein blood vessel lines in the finger vein blood vessel image and the total number Wb of pixels that are part of vein blood vessel lines in the other finger vein blood vessel image; calculating a matching rate based on total number Wab, total number Wa, and total number Wb; determining whether the matching rate satisfies a predetermined condition; and if so, identifying a match between the finger veins of the finger vein blood vessel image and the finger veins of the other finger vein blood vessel image.

In the above embodiments, the description of each embodiment emphasizes certain aspects. When a detailed description of a certain portion is lacking in an embodiment, reference can be made to the related description in other embodiments.

A person having ordinary skill in the art will clearly understand that for the sake of convenience and succinctness of description, the corresponding processes in the method embodiments set forth above can be referred to for the particular operating processes of the systems, devices, and elements described above and that a detailed description thereof has been omitted here.

In the several embodiments provided in the present application, it should be understood that the systems, devices, and methods that have been revealed can be realized by other methods. For example, the device embodiments set forth above are merely schematic in nature. For example, the division of units is merely a logical function division. During actual realization, it is possible to employ some other method of division. For example, multiple units or components can be combined or integrated into a single system, or some characteristics can be ignored or not implemented. Further, the mutual coupling, direct coupling, or communication connection that has been revealed or discussed can be effected through the indirect coupling or communication connection of certain interfaces, devices, or units, and can be electrical, mechanical, or of some other form.

The units described as separate parts may or may not be physically separated. The parts described as units may or may not be physical units, can be located in a single location, or can be distributed over multiple network units. As required, some portion or all of the units can be selected to achieve the objective of the present embodiment solution.

Additionally, the various functional units in the individual embodiments of the present teachings can be integrated into a single processing unit or can be physically present as individual independent units. Two or more units can also be integrated into a single unit. These integrated units can be realized with hardware or can be realized in the form of functional software units.

When integrated units are realized in the form of functional software units and are sold or used as independent products, they can be stored on a computer readable storage medium. Based on such an understanding, the technical solution of the present teachings or the portion that contributes to prior art or all or part of this technical solution can be realized in the form of a software product. This computer software product can be stored in a storage medium, including the use of some commands to cause a computer device (such as a personal computer, server, or network device) to execute all or some of the steps described in the various embodiments of the present teachings. These storage media include: USB flash drives, mobile hard drives, read-only memories (ROM), random access memories (RAM), magnetic disks, optical discs, and various other media capable of storing program code.

The finger vein identification method and device provided by the present teachings have been described in detail. A person having ordinary skill in the art, based on the thinking of the embodiments of the present teachings, will differ somewhat in terms of particular implementation method and scope of application. To sum up the above, the contents of this description are not to be understood as limiting the present teachings.

What is claimed is:

1. A method for performing finger vein identification comprising:
    collecting a finger vein image;
    employing a line fitting method to extract a region of interest from the finger vein image;
    conducting geometric normalization and grayscale normalization processing of said region of interest to obtain a processed region;
    determining finger vein blood vessel lines in said processed region to obtain a finger vein blood vessel image; and
    conducting finger vein identification based on the finger vein blood vessel image, wherein the conducting includes:
        determining a first total number of pixels in the finger vein blood vessel lines of the finger vein blood vessel image, a second total number of pixels in finger vein blood vessel lines of another finger vein blood vessel image, and a third total number of pixels at a particular coordinate position of the finger vein blood vessel lines in the finger vein blood vessel image and in the another finger vein blood vessel image,
        calculating a matching rate based on the first total number of pixels, the second total number of pixels, and the third total number of pixels, and
        identifying a match between the finger vein blood vessel image and the another finger vein blood vessel image based on the matching rate satisfying a condition.

2. The method of claim 1, wherein determining the finger vein blood vessel lines comprises:
    conducting processing to remove noise from the finger vein blood vessel image.

3. The method of claim 1, further comprising:
    using a line fitting method to extract the region of interest in the finger vein image by:
        employing the line fitting method to determine a fitting line running along a top and a fitting line running along a bottom; and
        based on a line running along a left side and a line running along a right side of said region of interest, having the fitting line running along the top and the fitting line running along the bottom determine said region of interest.

4. The method of claim 3, wherein using the line fitting method to determine the fitting line running along the top and the fitting line running along the bottom comprises:
    using a middle line to evenly divide the finger vein image into an upper portion and a lower portion and dividing said finger vein image into at least two sub-regions on an X-axis; and
    integrating the at least two sub-regions on a Y-axis, separately obtaining fitting first points running along the top by fitting points running along the top and obtaining second fitting points running along the bottom by fitting points running along the bottom.

5. The method according to claim 3, wherein conducting the geometric normalization and grayscale normalization processing of said region of interest to obtain the processed region comprises:
- using affine transformation to regionally normalize said region of interest and obtain a normalized region;
- using ellipse transformation to geometrically normalize the normalized region and obtain a geometrized region; and
- using grayscale normalization processing on the geometrized region to obtain said processed region.

6. The method according to claim 5, wherein using the affine transformation to regionally normalize said region of interest and obtain the normalized region comprises:
- determining an upper left intersection point of the fitting line running along the top in said region of interest and the line running along the left side of the finger vein image;
- determining a lower left intersection point of the fitting point running along the bottom in said region of interest and the line running along the left side of the finger vein image;
- determining an upper right intersection point of the fitting line running along the top of said region of interest and the line running along the right side of the finger vein image;
- determining a lower right intersection point of the fitting line running along the bottom of said region of interest and the line running along the right side of said finger vein image; and
- based on the upper left intersection point, the upper right intersection point, the lower left intersection point, and the lower right intersection point, using the affine transformation on said region of interest to conduct normalization and obtain the normalized region.

7. The method of claim 6, wherein:
determining the upper left intersection point and determining the lower left intersection point comprises:
- determining a first starting point on the line running along the left side in said finger vein image and determining said upper left intersection point and said lower left intersection point based on the first starting point, with a distance from the first starting point to the fitting line running along the top of said region of interest being equal to a distance from the first starting point to the fitting line running along the bottom of said region of interest; and determining the upper right intersection point and determining the lower right intersection point comprises:
- determining a first ending point on the line running along the right side of said finger vein image, and determining said upper right intersection point and said lower right intersection point based on the first ending point, with a distance from the first ending point to the fitting line running along the top of said region of interest being equal to a distance from the first ending point to the fitting line running along the bottom of said region of interest.

8. The method of claim 7, wherein obtaining the normalized region by affine transformation based on said upper left intersection point, upper right intersection point, lower left intersection point, and lower right intersection point comprises:
- determining a mid-line of said region of interest based on said first starting point and said first ending point;
- determining mid-line intersection points on said mid-line one-by-one from a beginning of the first starting point of said mid-line to an end of said first ending point of said mid-line;
- determining a straight line that passes through the mid-line intersection points and is perpendicular to said mid-line;
- normalizing a segment between the mid-line intersection point and the fitting line running along the top of said region of interest onto said straight line; and
- normalizing a segment between the mid-line intersection point and the line running along the bottom of said region of interest onto said straight line to obtain said normalized region.

9. The method of claim 8, wherein using the ellipse transformation to geometrically normalize the normalized region and obtain the geometrized region comprises:
- calculating coordinate points following geometric transformation of each pixel in the normalized region; and
- conducting the geometric transformation of said normalized region based on said coordinate points to obtain the geometrized region.

10. The method of claim 8, using the grayscale normalization processing on the geometrized region to obtain said processed region comprises:
- sequentially adopting each pixel in the geometrized region as a first center pixel;
- making the first center pixel a middle point of a square;
- marking the square of side length d;
- obtaining an average value and a variance of grayscale values of all pixels within said square; and
- based on the average value and the variance, changing a grayscale value of the first center pixel to obtain said processed region.

11. The method according to claim, wherein determining the finger vein blood vessel lines in said processed region comprises:
- sequentially adopting each pixel in a geometrized region as a center pixel, employing the center pixel as a center of a circle to mark the circle of radius r;
- determining a total number of pixels within said circle that have grayscale values not exceeding a grayscale value of said center pixel;
- when a determination is made that the total number satisfies a predetermined condition, determining that said center pixel is part of a finger vein blood vessel line and setting the grayscale value of said center pixel to a first grayscale value; and
- when a determination is made that the total number does not satisfy the predetermined condition, determining that the center pixel is not part of a finger vein blood vessel line and setting the grayscale value of the center pixel to a second grayscale value, such that when said first grayscale value is 255, said second grayscale value is 0, and when said first grayscale value is 0, said second grayscale value is 255.

12. The method according to claim 2, wherein conducting the processing to remove the noise of the finger vein blood vessel image comprises:
- sequentially determining a grayscale value of each pixel in the finger vein blood vessel image and grayscale values of eight pixels adjacent to said pixel;
- determining whether or not it is necessary to change the grayscale value of each pixel to a grayscale value corresponding to a predetermined condition based on the grayscale value of the pixel and the grayscale values of the eight pixels adjacent to the pixel; and if so, changing the grayscale value of the pixel to a grayscale value corresponding to the predetermined condition, with the grayscale values corresponding to the predetermined condition including a first grayscale value and a second grayscale value, such that when said first grayscale value is 255, said second grayscale value is 0, and when said first grayscale value is 0, said second grayscale value is 255.

13. The method of claim 12, wherein said predetermined conditions comprise:
when the grayscale value of the pixel is the first grayscale value, and the grayscale values of a pixel on a left side and a pixel on a right side of said pixel are both the second grayscale value, changing the grayscale value of said pixel to the second grayscale value; or
when the grayscale value of the pixel is the first grayscale value and the total number of pixels with the grayscale value of the first grayscale value among the eight pixels adjacent to said pixel is not greater than five, changing the grayscale value of the pixel to the second grayscale value.

14. A device for identifying finger veins is characterized by comprising:
a collecting module implemented by a processor and configured for collecting a finger vein image;
a region extracting module implemented by the processor and configured for employing a line fitting method to extract a region of interest in the finger vein image;
an image processing module implemented by the processor and configured for:
conducting geometric normalization and grayscale normalization processing of said region of interest to obtain a processed region, and
determining finger vein blood vessel lines in said processed region to obtain a finger vein blood vessel image; and
an identification module implemented by the processor and configured for conducting finger vein identification based on the finger vein blood vessel image,
wherein said identification module is further configured for:
determining a first total number of pixels in the finger vein blood vessel lines of the finger vein blood vessel image, a second total number of pixels in finger vein blood vessel lines of another finger vein blood vessel image, and a third total number of pixels at a particular coordinate position of the finger vein blood vessel lines in the finger vein blood vessel image and in the another finger vein blood vessel image
calculating a matching rate based on the first total number of pixels, the second total number of pixels, and the third total number of pixels, and
identifying a match between the finger vein blood vessel image and the another finger vein blood vessel image based on the matching rate satisfying a condition.

15. The device of claim 14, further comprising:
a noise processing module implemented by the processor and configured for conducting processing to remove noise from the finger vein blood vessel image.

16. The device of claim 14; wherein the region extracting module configured for:
employing a line fitting method to determine a fitting line running along a top and a fitting line running along a bottom; and
based on a line running along a left side and a line running along a right side of said region of interest, determining said region of interest with the fitting line running along the top and the fitting line running along the bottom.

17. The device of claim 16, wherein the region extracting module configured for:
employing a middle line to evenly divide the finger vein image into an upper portion and a lower portion, dividing said finger vein image into at least two sub-regions on an X-axis, and
integrating the at least two sub-regions on a Y-axis and separately obtaining first fitting points running along the top by fitting points running along the top and obtaining second fitting points running along the bottom by fitting points running along the bottom.

18. The device of claim 16, wherein the image processing module configured for:
employing affine transformation to regionally normalize said region of interest and obtain a normalized region,
employing ellipse transformation to geometrically normalize the normalized region, and obtain a geometrized region, and
employing grayscale normalization processing on the geometrized region to obtain said processed region.

19. The device of claim 18, wherein the image processing module configured for:
determining an upper left intersection point of the fitting line running along the top in said region of interest and the line running along the left side of the finger vein image,
determining a lower left intersection point of the fitting point running along the bottom in said region of interest and the line running along the left side of the finger vein image,
determining an upper right intersection point of the fitting line running along the top of said region of interest and the line running along the right side of the finger vein image,
determining a lower right intersection point of the fitting line running along the bottom of said region of interest and the line running along the right side of said finger vein image, and
based on the upper left intersection point, the upper right intersection point, the lower left intersection point, and the lower right intersection point, using the affine transformation on said region of interest to conduct normalization and obtain said normalized region.

20. The device of claim 19 wherein said image processing module configured for:
determining a first starting point on the line running along the left side in said finger vein image and determining said upper left intersection point and said lower left intersection point based on the first starting point, with a distance from the first starting point to the fitting line running along the top of said region of interest being equal to a distance from the first starting point to the fitting line running along the bottom of said region of interest; and
determining a first ending point on the line running along the right side of said finger vein image and determining said upper right intersection point and said lower right intersection point based on the first ending point, with a distance from the first ending point to the fitting line running along the top of said region of interest being equal to a distance from the first ending point to the fitting line running along the bottom of said region of interest.

21. The device of claim 20 wherein the image processing module configured for:

determining a mid-line of said region of interest based on said first starting point and said first ending point, determining a mid-line intersection points on said mid-line one-by-one from a beginning of the first starting point of said mid-line to an end of said first ending point of said mid-line, determining a straight line that passes through the mid-line intersection point and is perpendicular to said mid-line, normalizing a segment between the mid-line intersection point and the fitting line running along the top of said region of interest onto said straight line, and normalizing a segment between the mid-line intersection point and the line running along the bottom of said region of interest onto said straight line to obtain said normalized region.

22. The device of claim 21, wherein the image processing module is configured for:

calculating coordinate points following geometric transformation of each pixel in the normalized region; and conducting the geometric transformation of said normalized region based on said coordinate points to obtain the geometrized region.

23. The device of claim 21, wherein said image processing module is configured for:

sequentially adopting each pixel in the geometrized region as a first center pixel;

making the first center pixel a middle point of a square;

marking the square of side length d;

obtaining an average value and a variance of grayscale values of all pixels within said square; and based on the average value and the variance, changing a grayscale value of the first center pixel to obtain said processed region.

24. The device of claim 15, wherein said image processing module is configured for:

sequentially adopting each pixel in a geometrized region as a center pixel, employing the center pixel as the center of a circle to mark a circle of radius r;

determining a total number of pixels within said circle that have grayscale values not exceeding a grayscale value of said center pixel;

when a determination is made that the total number satisfies a predetermined condition, determining that said center pixel is part of a finger vein blood vessel line and setting the grayscale value of said enter pixel to a first grayscale value; and when a determination is made that the total number does not satisfy the predetermined condition, determining that the center pixel is not part of a finger vein blood vessel line and setting the grayscale value of the center pixel to a second grayscale value, such that when said first grayscale value is 255, said second grayscale value is 0, and when said first grayscale value is 0, said second grayscale value is 255.

25. The device of claim 15, wherein said image processing module is configured for:

sequentially determining a grayscale value of each pixel in the finger vein blood vessel image and grayscale values of eight pixels adjacent to said pixel;

determining whether or not it is necessary to change the grayscale value of each pixel to a grayscale value corresponding to a predetermined condition based on the grayscale value of each pixel and the grayscale values of the eight pixels adjacent to said pixel; and if so, changing the grayscale value of each pixel to a grayscale value corresponding to predetermined condition, with the grayscale values corresponding to the predetermined condition including the first grayscale value and the second grayscale value, such that when said first grayscale value is 255, said second grayscale value is 0, and when said first grayscale value is 0, said second grayscale value is 255.

26. The device of claim 25, wherein said predetermined conditions comprise:

when the grayscale value of the pixel is the first grayscale value, and the grayscale value of pixels to a left side and a right side of said pixel are both the second grayscale value, the grayscale value of said pixel is to be changed to the second grayscale value; or when the grayscale value of the pixel is the first grayscale value and the total number of pixels with the grayscale value of the first grayscale value among the eight pixels adjacent to said pixel is not greater than five, the grayscale value of the pixel is to be changed to the second grayscale value.

* * * * *